United States Patent
Melodia et al.

(10) Patent No.: US 11,184,783 B1
(45) Date of Patent: Nov. 23, 2021

(54) REAL-TIME CHANNEL-RESILIENT OPTIMIZATION OF RADIO FINGERPRINTING

(71) Applicant: Northeastern University, Boston, MA (US)

(72) Inventors: Tommaso Melodia, Newton, MA (US); Francesco Restuccia, Boston, MA (US); Salvatore D'Oro, Allston, MA (US)

(73) Assignee: NORTHEASTERN UNIVERSITY, Boston, MA (US)

( * ) Notice: Subject to any disclaimer, the term of this patent is extended or adjusted under 35 U.S.C. 154(b) by 0 days.

(21) Appl. No.: 16/832,741

(22) Filed: Mar. 27, 2020

Related U.S. Application Data (60) Provisional application No. 62/826,255, filed on Mar. 29, 2019.

(51) Int. Cl.
*H04W 24/02* (2009.01)

(52) U.S. Cl.
CPC .................. *H04W 24/02* (2013.01)

(58) Field of Classification Search
CPC ..... H04W 24/02; H04W 72/00; H04W 84/18; H04W 88/14
See application file for complete search history.

(56) References Cited

U.S. PATENT DOCUMENTS

| | | | | |
|---|---|---|---|---|
| 9,113,353 B1* | 8/2015 | Cotanis | ................. | H04W 16/18 |
| 2015/0289143 A1* | 10/2015 | McHenry | ............. | H04W 16/14 455/67.13 |
| 2016/0127392 A1* | 5/2016 | Baxley | .................. | H04W 4/021 726/23 |

OTHER PUBLICATIONS

Brik, V. et al., "Wireless Device Identification with Radiometric Signatures," In Proceedings of the 14th ACM International Conference on Mobile Computing and Networking (MobiCom), ACM, 116-127 (2008).

Chetlur, S. et al., "cuDNN: Efficient Primitives for Deep Learning," arXiv preprint arXiv: 1410.0759 (Dec. 2014).

Defense Advanced Research Projects Agency (DARPA). The Radio Frequency Spectrum + Machine Learning = A New Wave in Radio Technology, 4 pages, Available at: https://www.darpa.mil/news-events/2017-08-11a (2017).

Ettus Research (A National Instrument Company). VERT2450 Antenna, 2 pages, Available at: https://www.ettus.com/product/details/VERT2450 (2016).

(Continued)

*Primary Examiner* — Kyaw Z Soe
(74) *Attorney, Agent, or Firm* — Hamilton, Brook, Smith & Reynolds, P.C.

(57) ABSTRACT

A communications system provides for accurate fingerprinting of devices across a communications channel. A transmitter device modifies a physical layer signal prior to transmission as a function of signal modification parameters. A receiver device classifies a received physical layer signal and to outputs a classification indicator and a score. The receiver further analyzes the classification indicator and the score to produce an updated set of signal modification parameters provides the parameters to the transmitter device. The transmitter device, in turn, updates its signal modification parameters accordingly, thereby generating subsequent communications that more clearly indicate a fingerprint of the transmitter device.

32 Claims, 9 Drawing Sheets

(56) References Cited

OTHER PUBLICATIONS

Ettus Research (A National Instrument Company) CBX 1200-6000 MHz Rx/Tx (40 MHz). Available at: https://www.ettus.com/product/details/CBX (2018).

Goodfellow, I. et al., "Deep Learning," vol. 1, MIT Press, Cambridge (2016).

Johnson, E., "Physical limitations on frequency and power parameters of transistors," In 1958 IRE International Convention Record, vol. 13, IEEE, 27-34 (1966).

Krizhevsky, A. et al., "ImageNet Classification with Deep Convolutional Neural Networks," In NIPS, 9 pages (2012).

LeCun, Y. et al., "Deep learning," Nature, 521:436-444 (2015).

Nguyen, N. T. et al., "Device fingerprinting to enhance wireless security using nonparametric Bayesian method," In INFOCOM, 2011 Proceedings IEEE, 1404-1412 (2011).

O'Shea, T. and J. Hoydis, "An Introduction to Deep Learning for the Physical Layer," IEEE Transactions on Cognitive Communications and Networking, 3, 4: 563-575 (2017).

O'Shea, T. et al., "Over the Air Deep Learning Based Radio Signal Classification," IEEE Journal of Selected Topics in Signal Processing, 12, 1:168-179 (Feb. 2018), Available at: https://doi.org/10.1109/JSTSP.2018.2797022.

Peng, L. et al., "Design of a Hybrid RF Fingerprint Extraction and Device Classification Scheme," IEEE Internet of Things Journal, 1-1 (2018), 12 pages, Available at: https://doi.org/10/1109/JIOT/2018.2838071.

Rasmussen, K. B. and S. Capkun, "Implications of Radio Fingerprinting on the Security of Sensor Networks," In Security and Privacy in Communications Networks and the Workshops, SecureComm 2007, Third International Conference, IEEE, 331-340 (2007).

Restuccia, F. et al., "Securing the Internet of Things in the Age of Machine Learning and Software-defined Networking," IEEE Internetof Things Journal, 1-1 (2018), 14 pages, Available at: https://doi.org/10.1109/JIOT.2018.2846040.

Restuccia, F. and T. Melodia, "Big Data Goes Small: Real-Time Spectrum-Driven Embedded Wireless Networking Through Deep Learning in the RF Loop," To Appear in Proceedings of IEEE Infocom 2019, 9, pages, Available at https://tinyurl.com/RFLearnINFOCOM.

Riyaz, S. et al., "Deep Learning Convolutional Neural Networks for Radio Identification," IEEE Communications Magazine, 56, 9: 146-152 (2018), Available at: https://doi.org/10.1109/MCOM.2018.1800153.

Sicari, S. et al., "Security, privacy and trust in Internet of Things: The road ahead," Computer Networks, 76:146-164 (2015).

Sourour, E. et al., "Frequency Offset Estimation and Correction in the IEEE 802.11a WLAN," In Vehicular Technology Conference, 2004, VTC2004-Fall, 2004 IEEE 60th vol. 7, IEEE, 4923-4927 (2004).

Vo-Huu, T. et al., "Fingerprinting Wi-Fi Devices Using Software Defined Radios," in Proceedings of the 9th ACM Conference on Security & Privacy in Wireless and Mobile Networks, ACM, 3-14 (2016).

Xie, F. et al., "Optimized Coherent Integration-Based Radio Frequency Fingerprinting in Internet of Things," IEEE ntemet of Things Journal, 5, 5: 3967-3977 (Oct. 2018), Available at: https://doi.org/10.1109/JIOT.2018.2871873.

Xing, Y. et al., "On Radio Frequency Fingerprint Identification for DSSS Systems in Low SNR Scenarios," IEEE Communications Letters, 22, 11: 2326-2329 (Nov. 2018), Available at: https://doi.org/10.1109/LCOMM.2018.2871454.

Xu, Q. et al., "Device Fingerprinting in Wireless Networks: Challenges and Opportunities," IEEE Communications Surveys & Tutorials 18, 1: 94-104 (2016).

Zhao, K. and L. Ge, "A survey on the internet of things security," In Computational Intelligence and Security (CJS), 2013 9th International Conference on. IEEE, 663-667 (2013).

Zorzi, M. et al., "From Today's INTRAnet of Things to a Future INTERnet of Things: A Wireless-and Mobility-related View," IEEE Wireless Communications, 17, 6: 44-51 (2010).

* cited by examiner

| 97 | 0  | 0  | 0  | 1  |
|----|----|----|----|----|
| 0  | 98 | 1  | 0  | 0  |
| 0  | 1  | 99 | 3  | 1  |
| 2  | 0  | 0  | 97 | 0  |
| 1  | 1  | 0  | 0  | 98 |

(a) Static Dataset

| 74 | 2  | 5  | 2  | 4  |
|----|----|----|----|----|
| 12 | 80 | 16 | 26 | 14 |
| 0  | 4  | 68 | 12 | 2  |
| 12 | 10 | 6  | 54 | 1  |
| 2  | 4  | 5  | 6  | 79 |

(b) Live Data

REAL-TIME CHANNEL-RESILIENT OPTIMIZATION OF RADIO FINGERPRINTING

RELATED APPLICATION(S)

This application claims the benefit of U.S. Provisional Application No. 62/826,255, filed on Mar. 29, 2019. The entire teachings of the above application are incorporated herein by reference.

GOVERNMENT SUPPORT

This invention was made with government support under Grant No. N00164-18-R-WQ80 from the Department of Defense/DARPA. The government has certain rights in the invention.

BACKGROUND

The Internet of Things (IoT) encompasses a variety of different devices that are capable of connecting to a network to provide various communication functions. Such devices include televisions, speakers, wearables such as watches and fitness trackers, home appliances such as refrigerators, phones, tablet devices, fire alarms, security systems, and thermostats. An important challenge in the IoT is providing scalable, reliable and energy-efficient authentication mechanisms. However, most existing authentication mechanisms are not well-suited to the IoT because they are heavily based on cryptography-based algorithms and protocols, which are often too computationally expensive to be run on smaller, energy-constrained IoT devices.

To address this challenge, a number of techniques based on radio fingerprinting have been presented. A core observation behind radio fingerprinting is that wireless devices usually exhibit small-scale hardware-level imperfections typically found in off-the-shelf RF circuitry, such as phase noise, I/Q imbalance, frequency and sampling offset, and harmonic distortions. Because of these impairments, a number of wireless devices operating on the same baseband signal will necessarily transmit two slightly different RF waveforms. A "fingerprint" of the wireless device can be obtained by estimating the RF impairments on the received waveform and associating them to a given device.

SUMMARY

Example embodiments include a communications system comprising a transmitter device, a receiver device, and an analyzer. The transmitter device may include a transmitter configured to generate a physical layer signal to be transmitted across a communications channel, and a physical signal modifier configured to modify the physical layer signal prior to transmission as a function of a first set of signal modification parameters to produce a modified physical layer signal. The receiver device may include a classifier configured to process a received physical layer signal corresponding to the modified physical layer signal received via the communications channel and to output a classification indicator and a score based on characteristics of the received physical layer signal, which includes effects of the communications channel. The analyzer may be configured to analyze the classification indicator and the score to produce a second set of signal modification parameters and to provide the second set of signal modification parameters to the physical signal modifier to produce a subsequent modified physical layer signal to be transmitted across the communications channel.

The analyzer may identify the transmitter device based on a signature evident in the received physical layer signal, the signature associated with hardware of the transmitter device. The physical signal modifier may be configured to modify the physical layer signal in a manner emphasizing the signature relative to the signature evident in the physical layer signal. The signature may be a property of the physical layer signal emergent from one or more imperfections of the hardware of the transmitter device.

The physical signal modifier may be further configured to modify a subsequent physical layer signal based on the second set of signal modification parameters, the physical signal modifier generating a second modified physical layer signal. The analyzer may be further configured to 1) determine a third set of signal modification parameters based on the classification indicator and score associated with the second modified physical layer signal, and 2) transmit the third set of signal modification parameters to the physical signal modifier.

In further embodiments, a recovery block may be configured to transform the received physical layer signal into a data output signal, the recovery block reducing characteristics of the received physical layer signal that correspond to characteristics imposed by the physical signal modifier. The recovery block may performs the transform via an inverse Fourier transform based on representations of the received physical layer signal and the first set of signal modification parameters.

The classifier may include a neural network, such as a convolutional neural network. The score is a vector or matrix of scores that includes gradients generated by the neural network. The system of claim 1, wherein the physical signal modifier may be a finite impulse response (FIR) filter. The class may identify at least one of the following characteristics of the modified physical layer signal: communications protocol, modulation format, frequency band, communications technology, and encryption scheme. The communications channel may be a wireless channel, a wired channel, a fiber optic channel, a free space optical channel, and/or a fluidic channel.

Further embodiments include a transmitter device comprising and transmitter and a physical signal modifier. The transmitter may be configured to generate a physical layer signal to be transmitted across a communications channel. The physical signal modifier may be configured to 1) modify the physical layer signal prior to transmission as a function of a first set of signal modification parameters to produce a modified physical layer signal, 2) update the first set of signal modification parameters with a second set of signal modification parameters received from a receiver device following receipt of the modified physical layer signal, and 3) modify a subsequent physical layer signal prior to transmission as a function of the second set of signal modification parameters to produce a subsequent modified physical layer signal.

Further embodiments include a receiver device comprising a classifier and an analyzer. The classifier may be configured to process a received physical layer signal received via a communications channel and to output a classification indicator and a score based on characteristics of the received physical layer signal, which includes effects of the communications channel. The analyzer may be configured to analyze the classification indicator and the score to produce a set of signal modification parameters and to provide the set of signal modification parameters to a transmitter device to produce a modified physical layer signal to be transmitted across the communications channel.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

A core security challenge for the Internet of Things (IoT) is to devise reliable and energy-efficient authentication techniques. Radio fingerprinting addresses this problem by leveraging the unique hardware-level imperfections imposed on the received wireless signal by the transmitter's radio circuitry, thus avoiding energy-expensive cryptography that would otherwise be required by the transmitter. Typical approaches to radio fingerprinting utilize hand-tailored, protocol-specific feature extraction techniques, which can identify devices operating under a pre-defined wireless protocol only and, thus, are not amenable to fingerprint the multitude of wireless devices currently available in the IoT. Conversely, by mapping inputs onto a very large feature space, deep learning algorithms can be trained to fingerprint large populations of devices operating under any wireless standard.

Traditional techniques for radio fingerprinting rely on complex feature-extraction techniques that leverage protocol-specific characteristics (such as WiFi pilots/training symbols or ZigBee O-QPSK modulation) to extract hardware impairments. Therefore, they are not general-purpose in nature and are hardly applicable to the IoT, where a plethora of different wireless protocols are used. Example embodiment, described below, employ techniques based on deep learning to design general-purpose, high-performance, and optimizable radio fingerprinting algorithms. Deep learning goes beyond "shallow" neural networks and can autonomously extract extremely complex features thanks to the very large number of parameters (e.g., in the order of 106 or more). Thus, deep neural networks can analyze unprocessed I/Q samples without the need of application-specific and computational-expensive feature extraction and selection algorithms.

There are a number of challenges in applying deep learning techniques to RF fingerprinting. First, deep learning models usually require a significant time to be retrained, even with modern GPUs. Therefore, the underlying deep learning model may not be capable of being retrained in real time. Second, a fingerprinting system should evaluate the impact of adversarial actions. Typical approaches have not evaluated if and when an adversary can imitate a legitimate device's fingerprint. A further challenge is the potentially disruptive action of the wireless channel on a system's fingerprinting accuracy. This is because, due to channel action, two identical waveforms transmitted by the same RF interface at two different moments in time are usually different from each other. This implies that the models will operate on non-stationary input data, which significantly decreases the model's fingerprinting accuracy when the classifier is used on data collected with a wireless channel that is significantly different from the one used to train it.

Example embodiments address the challenges described above by providing a communications system that optimizes the accuracy of deep-learning-based radio fingerprinting without retraining the underlying deep learning model. In one example, through the application of an optimized physical signal modifier (e.g., a digital finite input response filter (FIR)) at a transmitter device, modifications can be applied to the waveform to strengthen its fingerprint according to the current channel conditions. The Waveform Optimization Problem (WOP) can be mathematically formulated as the problem of finding, for a given trained neural network, the optimum FIR to be used by the transmitter to improve its current fingerprinting accuracy. Moreover, because the FIR is tailored to the specific device's hardware imperfections, an adversary will not be able to use the FIR to imitate a legitimate device's fingerprint. Example embodiments may substantially increase fingerprinting accuracy over prior approaches, decrease an adversary's accuracy when trying to imitate another device's fingerprints.

Figure 1:
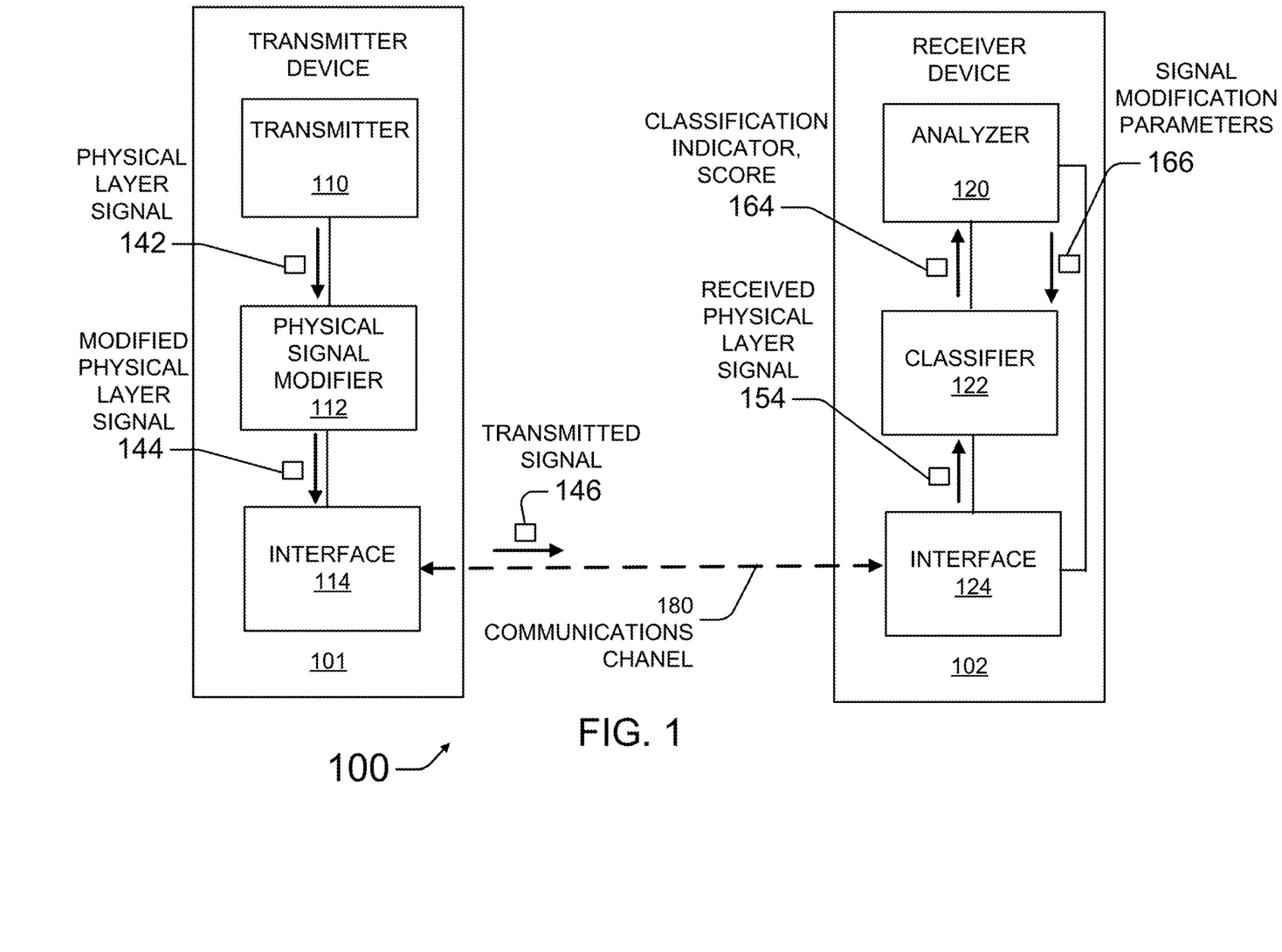
FIG. 1 is a block diagram of a communications system in one embodiment.

FIG. 1 is a block diagram of a communications system 100 in one embodiment. The system 100 includes a transmitter device 101 and a receiver device 102 communicatively coupled via a communications channel 180. One or both of the devices 101, 102 may be implemented in an IoT device and/or a device in communication with an IoT device. For example, the transmitter device 101 may be a component of an IoT device such as a mobile phone, and the receiver device 102 may be a component of a wireless access point configured to provide the mobile phone access to a network such as the Internet. Further, the transmitter device 101 and receiver device 102 may each be components of a transceiver at their respective devices, wherein those transceivers may include addition circuitry (not shown) enabling each of the devices to transmit and receive communications across the communications channel 180. The communications channel 180 may be a wireless channel (e.g., WiFi, Long-Term Evolution (LTE)), or may be a wired channel, a fiber optic channel, a free space optical channel, or a fluidic channel.

The system 100 may operate to authenticate the transmitter device 101 through fingerprinting (e.g., radio fingerprinting) of signals transmitted across the communications channel 180. During such an operation, at the transmitter device 101, a transmitter 110 may first generate a physical layer signal 142. The physical layer signal 142 may be a data signal as configured for transmittal by the physical layer of the transmitter device 101 across the communications channel 180, and may encompass data, commands, a test pattern, or other communications intended for transmission to the receiver device 102. A physical signal modifier 112 may include a filter such as a finite impulse response (FIR) filter, and may receive and modify the physical layer signal 142 in a manner that emphasizes a set of characteristics that are imprinted on the physical layer signal 142 by the physical layer (e.g., hardware) of the transmitter device 101. These characteristics may be referred to as a "signature" or a "fingerprint" of the transmitter device 101. In order to emphasize those characteristics, the physical signal modifier 112 may modify the signal 142 as a function of a set of signal modification parameters as described in further detail below. A communications interface 114, in turn, may transmit the resulting modified physical layer signal 144 as a transmitted signal 146 across the communications channel 180, where it is received by an interface 124 at the receiver device 124.

The interface 124 may produce a received physical layer signal 154 corresponding to the transmitted signal 146, and a classifier 122 (e.g., a convolutional neural network) may process the signal 154 to determine one or more characteristics about the signal 154. In particular, the classifier may classify the signature characteristics of the received signal 154 to determine correspondence with the signature of the transmitter device 101, and may output a classification indicator and score 164. The classification indicator may indicate a highest probability match to a known device (such as the transmitter device 101), and the score (e.g., a gradient) may indicate an estimated probability that the classification is accurate. As a result of the emphasized characteristics of the modified physical layer signal 144, the signature of the transmitter device 101 may be more clearly determined in the received physical layer signal 154, thereby compensating for any degradation of the transmitted signal 146 imposed by the communications channel 180.

An analyzer 120 may operate to analyze the classification indicator and score 164 and determine, accordingly, whether to update signal modification parameters for the physical signal modifier 112 to improve the accuracy of the classifier 122 in subsequent operation. For example, the analyzer 120 may note a score 164 that is sub-optimal, indicating a relatively low confidence in the ability of the classifier 122 to accurately identify and authenticate the transmitter device 101. Accordingly, the analyzer 120 may modify the previous signal modification parameters in a manner estimated to more clearly emphasize the signature of the transmitter device 101 in the modified physical layer signal 144. The analyzer 120 may then output this update as signal modification parameters 166, which the interface 124 may then transmit to the physical signal modifier 112 via the channel 180. If the physical signal modifier 112 is a FIR filter, then the signal modification parameters 166 may include tap settings for the FIR filter. The process of analyzing the received physical layer signal 154 and updating the signal modification parameters at the physical signal modifier 112 may be carried out continuously, periodically or responsive to a command, and may be performed throughout varying conditions of the communications channel 180, such as changes in location, interference, communications protocol, and/or devices linked to the communications channel 180. As a result, the system 100 can maintain accurate authentication of the transmitter device 101 under a range of different conditions that may otherwise obscure the signature of the transmitter device 101.

Figure 2:
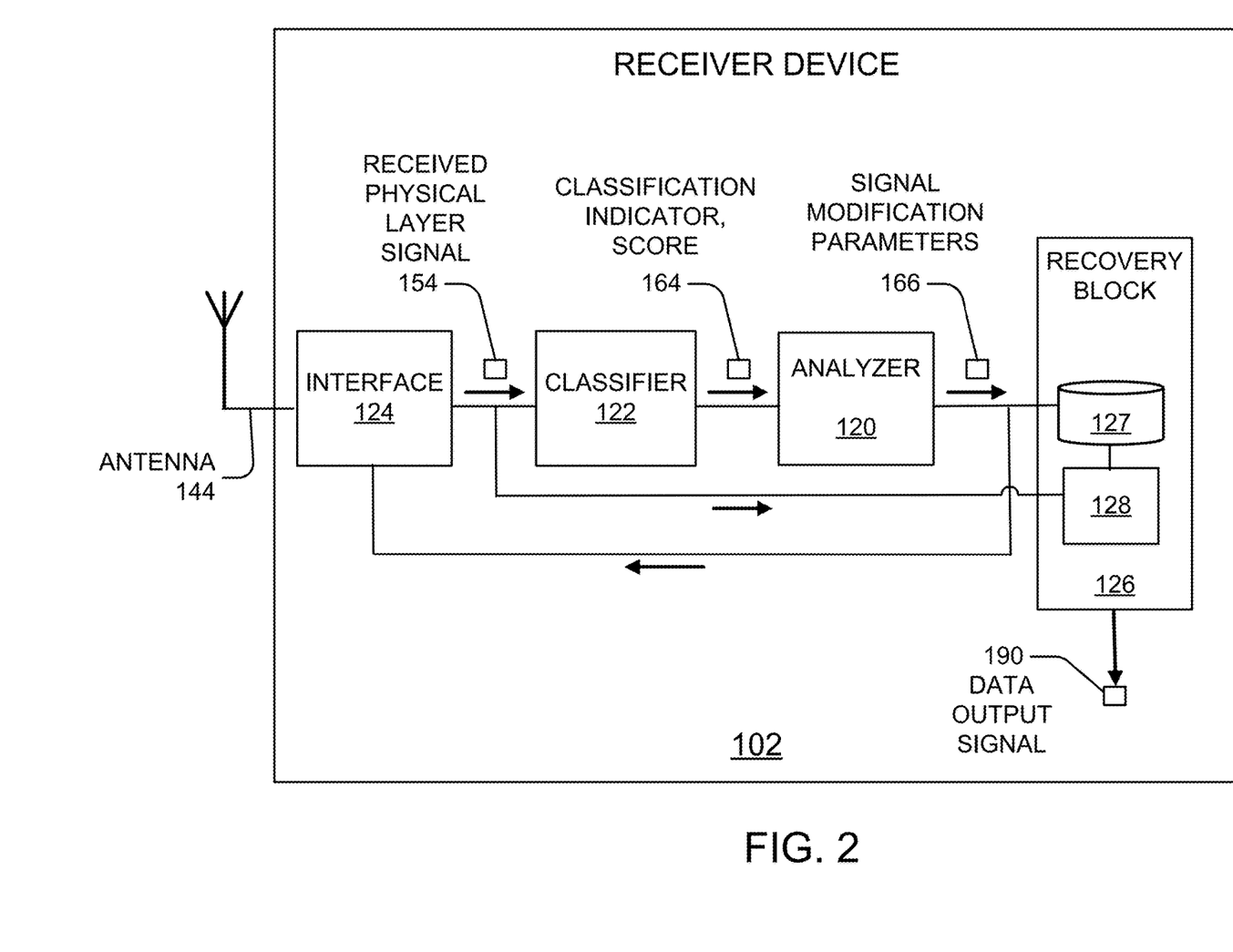
FIG. 2 is a block diagram of a receiver device in one embodiment.

FIG. 2 is a block diagram of the receiver device 102 in further detail and configured for communications across a wireless channel. In such a configuration, the communications channel 180 is the wireless channel, and the interface 124 engages with the channel 180 via an antenna 144. As described above, the interface 124 may forward the received physical layer signal 154 to the classifier 122, which provides the classification indicator and score 164 to the analyzer 120. The analyzer 120, in turn, provides signal modification parameters 166 to the interface 124, which forwards the parameters 164 to the transmitter device 101 via the communications channel 180.

Further, a recovery block 126 may operate to recover the data inherent in the received physical layer signal 154, generating a corresponding data output signal 190. To do so, the recovery block 120 may include a parameter store 127 (e.g., a register) to store one or more sets of the signal modification parameters 166 generated by the analyzer 120 over time. In particular, the parameter store 127 may store the previously-generated signal modification parameters that were used by the physical signal modifier 112 to generate the modified physical layer signal 144 corresponding to the received physical layer signal 154. A transform block 128 may receive the previously-generated signal modification parameters, as well as the received physical layer signal 154, and may transform the received physical layer signal 154 based on the previously-generated signal modification parameters. For example, the transform block 128 may perform an inverse Fourier transform of the received physical layer signal 154 as a function of the previously-generated signal modification parameters. As a result, the data output signal 190 may represent the data carried by the physical layer signal. In order to apply the correct signal modification parameters to the transform block 128, the recovery block 126 may be further configured to track a time at which each set of signal modification parameters are generated, thereby enabling the recovery block 126 to apply a given set of parameters to the transform block 128 after those parameters have been implemented by the physical signal modifier 112 at the transmitter device 101.

Figure 3:
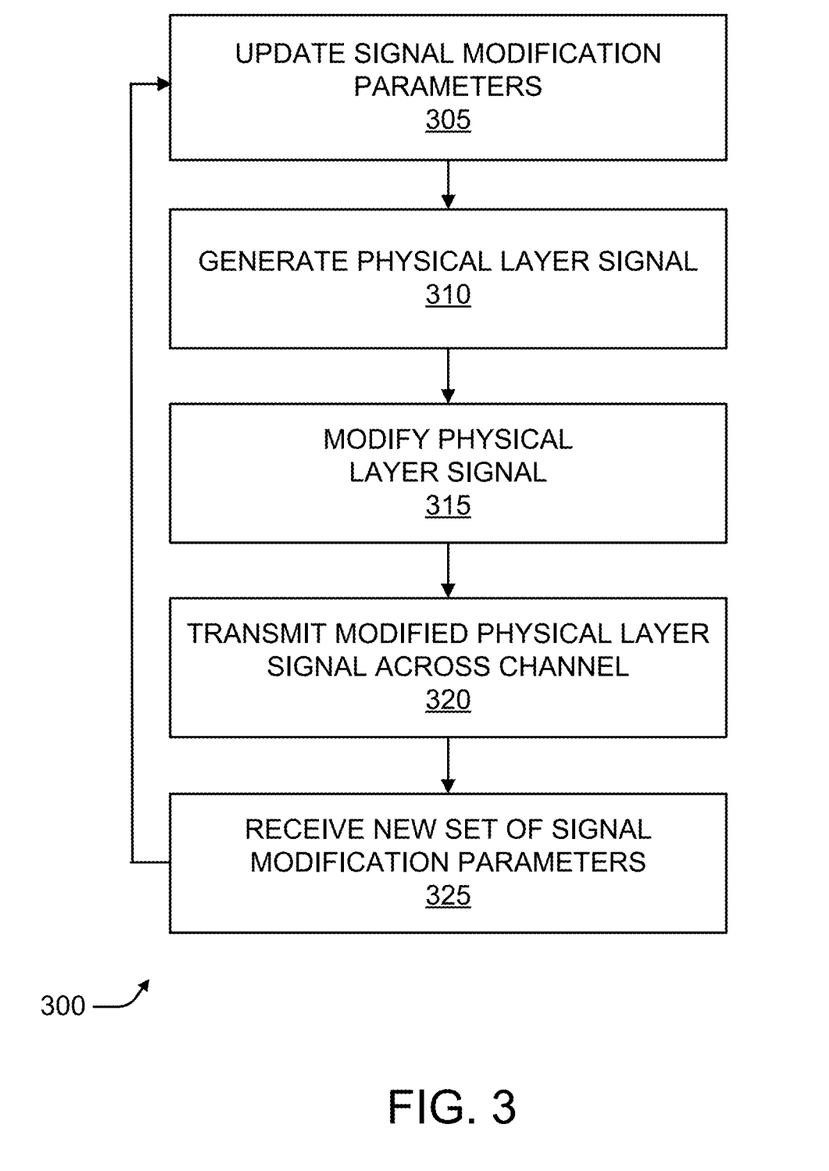
FIG. 3 is a flow diagram of a process operated by a transmitter in one embodiment.

FIG. 3 is a flow diagram of a process 300 that may be operated by a transmitter device to generate a signal for transmission. With reference to FIGS. 1 and 2, the transmitter device 101 may receive the signal modification parameters 166 from the receiver device 102 via the communications channel 180, and may apply those parameters 166 to update the signal modification parameters of the physical signal modifier 112 (305). If the receiver device 102 has not yet provided such parameters (e.g., prior to a first transmission by the transmitter 101), then the physical signal modifier 112 may instead implement a default set of parameters or a set of parameters from a previous transmission session.

The transmitter 110 may then generate the physical layer signal 142 (310). The physical signal modifier 112, in turn, may receive and modify the physical layer signal 142 as a function of the aforementioned signal modification parameters (315). The communications interface 114 may then transmit the resulting modified physical layer signal 144 as a transmitted signal 146 across the communications channel 180, where it is received by an interface 124 at the receiver device 124 (320). After a period of time following processing an analysis of the received physical layer signal 154, the receiver device 102 may return the updated signal modification parameters 166, which is received by the interface 114 (325). The transmitter device 101 may then repeat the process 300 beginning with applying the updated signal modification parameters 166 to the physical signal modifier 112, and then modifying subsequent physical layer signals under the updated parameters.

Figure 4:
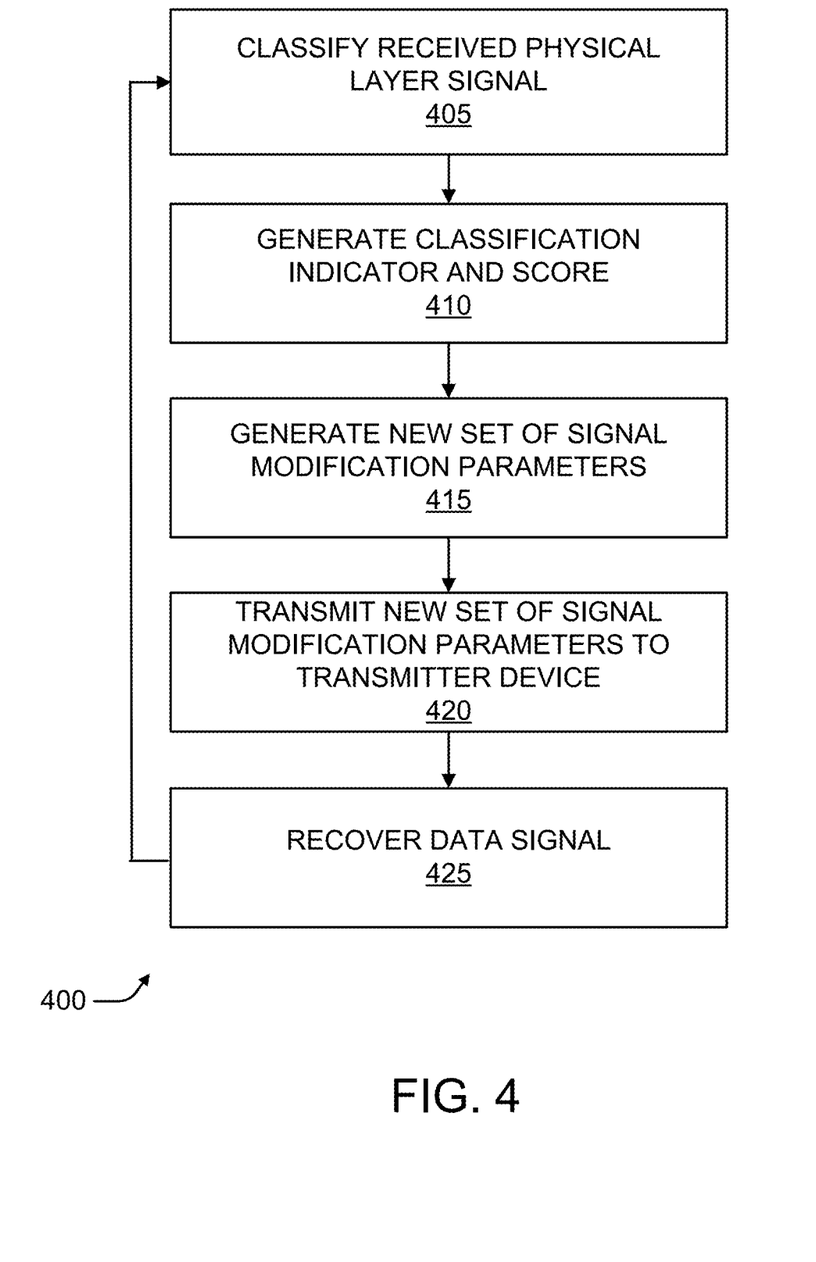
FIG. 4 is a flow diagram of a process operated by a receiver in one embodiment.

FIG. 4 is a flow diagram of a process 400 that may be operated by a receiver device to process a received signal and generate feedback to tune a transmitter device. With reference to FIGS. 1 and 2, the interface 124 may produce the received physical layer signal 154 corresponding to the transmitted signal 146, and the classifier 122 may process the signal 154 to classify the signal 154 (405). In particular, the classifier 122 may classify the signature characteristics of the received signal 154 to determine correspondence with the signature of the transmitter device 101, and may output the classification indicator and score 164 (410).

The analyzer 120 may then analyze the classification indicator and score 164 and determine, accordingly, whether to update signal modification parameters for the physical signal modifier 112 to improve the accuracy of the classifier 122 in subsequent operation. If so, the analyzer 120 may modify the previous signal modification parameters to generate new/updated signal modification parameters 166 (415). For example, the analyzer may modify the previous signal modification parameters by advancing through a sequence of possible parameters (e.g., FIR tap settings), and the degree of this advancement may be dependent upon the score 164, wherein a score indicating a lower confidence may prompt a larger change to the signal modification parameters. The interface 124 may then transmit the new/updated set of signal modification parameters 166 to the physical signal modifier 112 of the transmitter device 101 via the communications channel 180. Lastly, the recovery block 126 may operate to recover the data inherent in the received physical layer signal 154, generating a corresponding data output signal 190. The process 400 may be repeated, wherein the receiver device 102 may carry out the process 400 continuously, periodically or responsive to a command, and may perform throughout varying conditions of the communications channel 180, such as changes in location, interference, communications protocol, and/or devices linked to the communications channel 180.

Figure 5A:
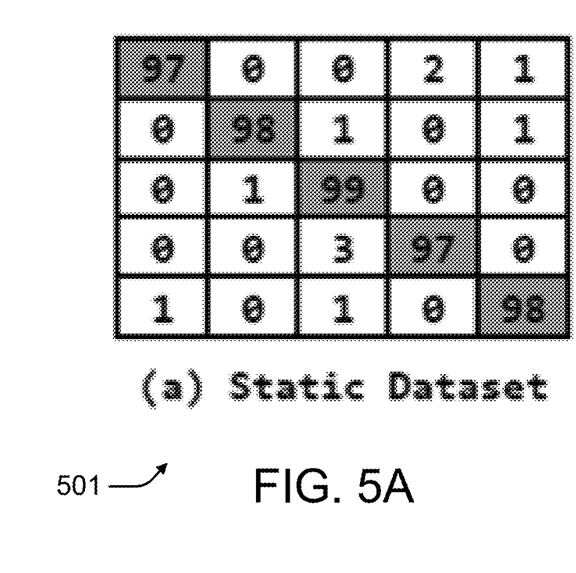
FIGS. 5A-B are example confusion matrices relating to a device fingerprinting process in one embodiment.
Figure 5B:
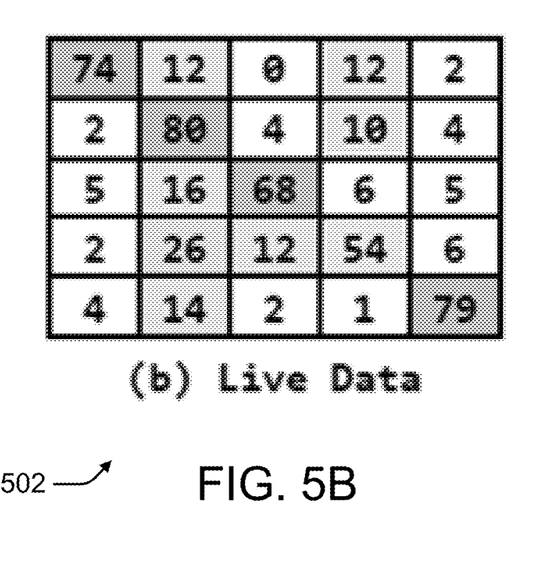

FIGS. 5A-B depict example confusion matrices 501, 502 relating to a device fingerprinting process. The confusion matrices 501, 502 are example products of a deep learning model trained to fingerprint 5 devices in an experimental test. FIG. 5A shows a confusion matrix 501 of a 5-device bit-similar model with an original dataset, while FIG. 5B shows a confusion matrix 502 of the same model with live-collected data. The confusion matrix 501 was computed on data collected approximately 5 minutes after the training data was collected, while the confusion matrix 502 was obtained by testing the model on completely new data collected 7 days after the model was trained. As demonstrated by the differences between the confusion matrices 501, 502, fingerprinting accuracy decreases significantly when data collected under completely different channel conditions is fed to the model, demonstrating that the channel's action must indeed be addressed through real-time optimization. Thus, different wireless channel conditions may cause a loss in fingerprinting accuracy.

Example Embodiment: Real-Time Optimization of FIR Filter for Classification by Convolutional Neural Network (CNN)

The goal of optimizing the accuracy of fingerprinting systems arises from the fact that the wireless channel is dynamic and nearly unpredictable in nature. Thus, hardware impairments such as I/Q imbalances, DC offset, phase noise, carrier/sampling offsets, and power amplifier distortions can be disrupted by the channel's action. Moreover, these impairments are also time-varying and dependent on a number of factors, such as local oscillator (LO) frequency and current temperature of the RF circuitry. These considerations suggest that impairments cannot be assumed to be perfectly stationary; thus, real-time optimization is advantageous.

To address the non-stationary nature of the problem, convolutional neural networks (CNNs) are well-suited to recognize complex "patterns" in input data. In this application, these patterns include the imperfections in the radio hardware. However, a major challenge that remains is how to optimize the CNN's output for a given device without retraining the CNN itself. To answer this question, example embodiments may employ an approach based on finite impulse response (FIR) filtering of a transmitter's baseband signal to "restore" the patterns that are disrupted by the current channel conditions, thus making the signal "more recognizable" to the CNN. FIRs are advantageous because (i) FIRs can be implemented in both hardware and software on almost any wireless device; (ii) the computation complexity of applying a FIR filter of length m to a signal is $O(m)$—thus, it is an efficient algorithm; and (iii) its effect on the BER can be almost perfectly compensated at the receiver's side.

However, this approach raises another challenge, which is how to set the FIR taps in such a way that the fingerprinting accuracy for a given device is maximized. One may find the FIR that modifies input x so that the resulting x* signal maximizes the neuron activation correspondent to a given device. This FIR can be found efficiently because the layers inside CNNs, although non-linear, are derivable, and, thus, the gradient of the output with respect to the FIR taps can be computed according to a given input.

Figure 6:
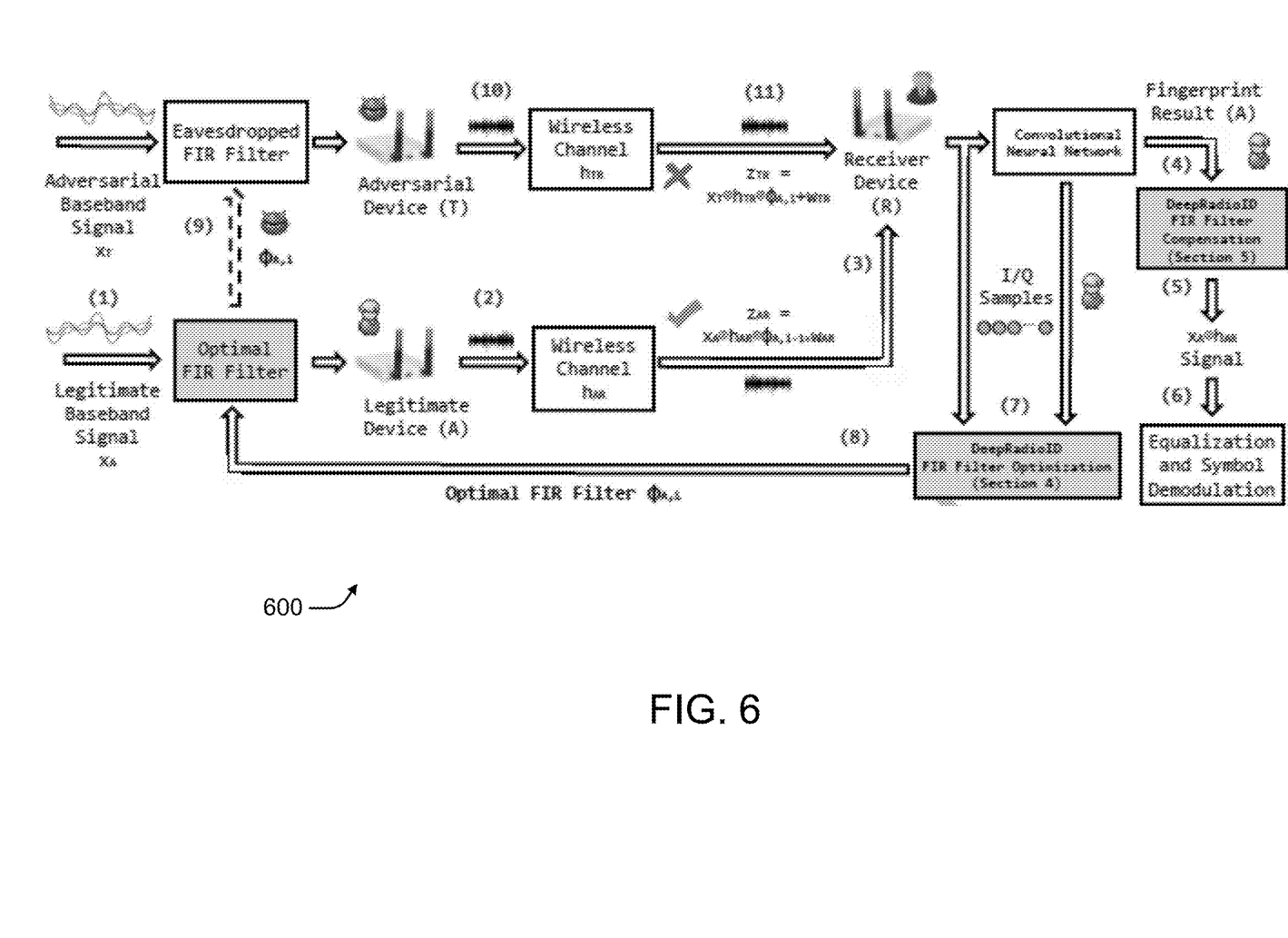
FIG. 6 is a block diagram of a communications system in a further embodiment.

FIG. 6 is a block diagram of a communications system 600 in a further embodiment. The system may include one or more features of the system 100 described above with reference to FIGS. 1-4. The system 600 includes a legitimate device A configured to transmit communications to a receiver device R, while the receiver device R is configured to authenticate the legitimate device A and reject communications from an adversarial device T. The first action for the legitimate device A that is to be authenticated by the receiver R is to filter its baseband signal with FIR $\phi_{A,\,i-1}$(1), which was obtained at the previous optimization step. FIR $\phi_{A,0}$ is set to 1 (i.e., no filtering). The filtered signal is then sent to A's RF interface (2). By also accounting the effect of the wireless channel, "R" will receive a baseband signal:

$$z_{AR} = x_A \circledR \phi_{A,i-1} \circledR h_{AR} + w_{AR}$$

where $x_A$ is the transmitted symbol sequence, $h_{AR}$ and $w_{AR}$ are the fading and noise introduced by the channel, respectively. The I/Q samples of $z_{AR}$ are then fed to a CNN to fingerprint the originating device (4). The fingerprinting result is then used to compensate the FIR filter $\phi_{A,i-1}$(5), so that the resulting signal is then sent to the symbol demodulation logic to recover the application's data (6). The I/Q samples and the fingerprinting result are then fed to the FIR Optimization module (7). The optimal FIR filter $\phi_{A,i}$ is then sent back to A to improve its fingerprinting accuracy (8).

Adversarial action may occur as follows. An adversarial device "T" is capable of eavesdropping A's FIR $\phi_{A,i}$. T's goal is to impersonate A by spoofing A's hardware fingerprint (9). After T's baseband signal is transmit—ted and goes through the wireless channel (10), the baseband signal received by R will be:

$$z_{TR} = x_R \circledR \phi_{A,i-1} \circledR h_{TR} + w_{TR}$$

which is then fed to the CNN as input. However, because A's FIR filter has been optimized for A's unique hardware impairments and A's current wireless channel, T will not be able to imitate A's fingerprint by using A's FIR filter.

FIR Optimization

We can define as input a set of N consecutive I/Q samples that constitute an input to the classifier. We can also define as slice a set of S inputs, and as batch a set of B slices. We can label the D devices being classified with a label between 1 and D. We model the classifier as a function $f:X \rightarrow Y$, where $X \subseteq \mathbb{C}^N$ and $Y \subseteq \mathbb{R}^D$ represent respectively the spaces of the classifier's input (i.e., an example) and output (i.e., a probability distribution over the set of D devices). Specifically, the output of the classifier can be represented as a vector $(f1, f2, \ldots, f_D) \in Y$, where the i-th component denote the probability that the input fed to the CNN belongs to device i.

The system 600 may rely on discrete causal finite impulse response filters (FIRs) to achieve real-time adaptive waveform modification. FIRs present several advantages. First, causal filters do not depend on future inputs, but only on past and present ones. Second, FIRs can be represented as a weighted and finite term sum, which allows for accurately predicting the output of the FIR for any given input. More formally, a FIR is described by a finite sequence $\phi$ of M filter taps, i.e., $\phi = (\phi_1, \phi_2, \ldots, \phi_M)$. For any input $x \in X$, the filtered n-th element $\hat{x}[n] \in \hat{x}$ can be written as:

$$\hat{x}[n] = \sum_{j=0}^{M-1} \phi_j x[n-j] \quad (1)$$

Because both wireless channel and hardware impairments operate in the complex domain by rotating and amplifying/attenuating the amplitude of the signal, we can manipulate the position in the complex plane of the transmitted I/Q symbols. By using complex-valued filter taps, i.e., $\phi_k \in \mathbb{C}$ for all $k = 0, 1, \ldots, M-1$, we can rewrite the equation (1) as follows:

$$\hat{x}[n] = \sum_{k=0}^{M-1} (\phi_k^R + j\phi_k^I)(x^R[n-k] + jx^I[n-k]) = \hat{x}^R[n] + j\hat{x}^I[n] \text{ where} \quad (2)$$

$$x_k^R[n] = \operatorname{Re}\{x_k[n]\}, x_k^I[n] = \operatorname{Im}\{x_k[n]\}, \phi_k^R = \operatorname{Re}\{\phi_k\} \text{ and}$$

$$\phi_k^I = \operatorname{Im}\{\phi_k\}$$

Eq. (2) shows that that it is possible to manipulate the input sequence by filtering each I/Q sample. For example, to rotate all I/Q samples by $\theta = \pi/4$ radiants and halve their amplitude, we may set $$\phi_1 = \frac{1}{2}\exp^{j\frac{\pi}{4}} \text{ and } \phi_k = 0$$

for all k>1. Similarly, other complex manipulations can be obtained by fine-tuning filter taps.

Figure 7:
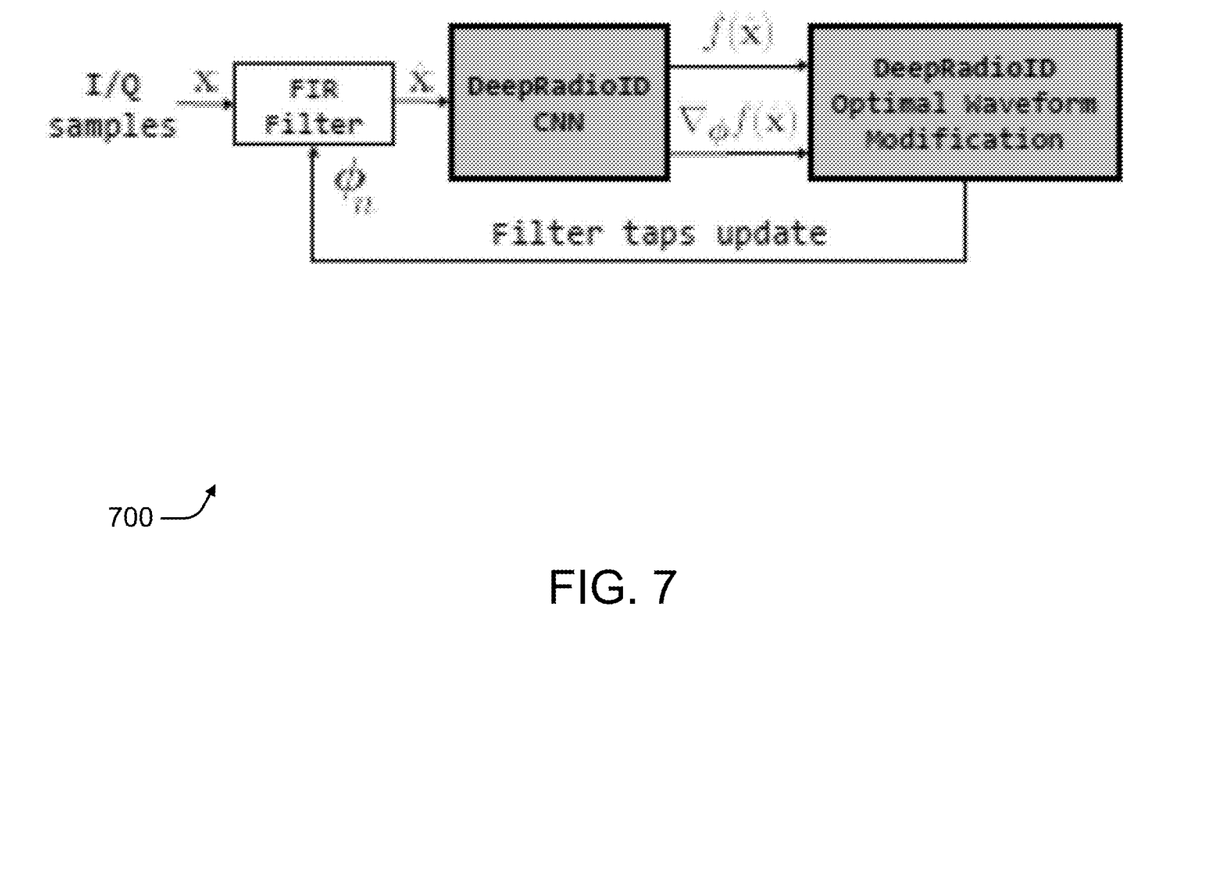
FIG. 7 is a flow diagram of a process of optimizing transmitter device settings in one embodiment.

FIG. 7 is a flow diagram of a process 700 of optimizing transmitter device settings in one embodiment. Although channel equalization can effectively reduce the effect of channel distortions on the position of the received I/Q samples, the algorithms involved are generally not perfect and only partially counteract phase and amplitude variations caused by the channel. For this reason, we must devise techniques to dynamically adapt to rapidly changing channel conditions (e.g., fast-fading/multi-path) and thus improve the fingerprinting accuracy for a given device.

Referring back to FIG. 6, the system 600 leverages FIR filters to maximize the accuracy of the classifier by dynamically counterbalancing inaccurate channel equalization. FIG. 7 illustrates waveform modification optimization loop that may be performed by system 600. Specifically, we add a FIR filter before the first CNN layer. This additional layer uses FIRs to manipulate the input example according to the above equation. The corresponding output sequence is then fed to the CNN.

As shown in FIG. 6, let A be the target device for which we want to improve the detection accuracy of the CNN, and $\phi_{A,i}$ may represent the filter taps associated to the target device at the i-th optimization step. By using the filtering-based waveform modification on the input sequence x, the output $f_A(\hat{x}) \in Y$ of the classifier with respect to the filtered sequence $\hat{x}$ can be written as a function of the filter taps $\phi_A$. Specifically:

$$f_A(\hat{x}) = f_A(x, \phi_A) \quad (3)$$

Eq. (3) shows that the accuracy of the classifier depends on the actual FIR tap vector $\phi_A$. Thus, we are interested in devising mechanisms to optimally manipulate $\phi_A$ such that (i) the classification accuracy for the target device is maximized; and (ii) the waveform modification does not negatively impact the BER of data transmission activities.

Waveform Optimization

An objective of the system 600 may be described as follows: (i) maximize the accuracy of the classifier for a specific target device A; and (ii) to guarantee that the resulting BER does not exceed a given maximum tolerable threshold BERmax. Since we aim at achieving channel-resilient waveform modification, we need to compute a FIR parameter configuration $\phi_A$ that can be used for multiple consecutive transmissions. It is worth mentioning that to compute different $\phi_A$ values for each single input x is inefficient in many cases. Indeed, the obtained FIR would be effective for the considered input only, i.e., if applied to another input sequence x'≠x, the FIR might decrease the accuracy of the classifier. Thus, maximizing the accuracy with respect to a single input x might result in poor performance.

To overcome the above problem, rather than maximizing the accuracy of the classifier on an input-by-input basis, we compute the FIR $\phi_A$ that maximizes the activation probability $f_A$ over a set of S consecutive inputs, i.e., a slice.

To simplify the notation, both A and i subscripts may be removed. The Waveform Optimization Problem (WOP) can be then defined as follows:

$$\underset{\phi}{\text{maximize}} \frac{1}{S} \sum_{s=1}^{S} f_A(x_s, \phi) \quad \text{(WOP)}$$

$$\text{subject to } BER_A(x_s, \phi) \le BER_{max}, \forall s = 1, 2, \ldots, S \quad \text{(C1)}$$

where the objective function represents the per-slice average activation probability for device A, $x_s$ is the s-th input of the slice, and the BER A(•) represents the BER function corresponding to transmissions from target node A.

Problem (WOP) is significantly challenging because (i) the function $f(x, \phi)$ is CNN-specific and depends from a very high number of parameters (generally in the order of millions), it is highly nonlinear and cannot be written in closed-form; (ii) the maximum BER constraint (C1) depends from numerous device-specific parameters (e.g., modulation, coding, transmission power and SNR) and it is generally non-linear.

Notwithstanding the above challenges, the impact of the waveform modification procedure on the BER of communications among the receiver and the target device A is negligible. In fact, as shown in FIG. 6, the system 600 embeds a FIR Filter Compensation module that uses features of FIR filters (e.g., their Fourier transform) to successfully reconstruct the original transmitted unfiltered sequence of I/Q symbols. This compensation procedure effectively removes any coupling between waveform modification procedures and BER, i.e., BERA(x, ϕ)≈BERA(x). Accordingly, it is possible to relax Constraint (C1) by removing it from the optimization problem (WOP). The relaxed WOP can be formulated as $$\underset{\phi}{\text{maximize}} \sum_{s=1}^{S} f_A(x_s, \phi) \quad \text{(RWOP)}$$

where we have also omitted the constant term 1/S.

As described above, $f(x, \phi)$ is nonlinear and generally does not possess any useful property in terms of monotonicity, concavity and existence of a global maximizer. However, for any input x of the slice, by using back-propagation and the chain rule of derivatives it is possible to let the CNN compute the gradient $\nabla_{\hat{x}} f(\hat{x})$ of the classification function $f$ with respect to the filtered input sequence $\hat{x}$. It is worth noting that $\nabla_{\hat{x}} f(\hat{x})$ shows how different input sequences affect the accuracy of the classification function. Nevertheless, we are interested in evaluating the gradients $\nabla_{\phi} f(\hat{x})$ to predict how the accuracy of the classifier varies as a function of the FIR filtering function. Hence, we can extend back-propagation to the waveform modification block.

From Eq. (2), $\hat{x}$ is a function of $\phi$, thus the gradient of $f$ with respect to the filter taps $\phi$ can be computed as:

$$\nabla_{\phi} f(\hat{x}) = J_f(\phi)^T \cdot \nabla_{\hat{x}} f(\hat{x}) \quad (4)$$

where $J_f(\phi)$ is the Jacobian matrix of $f(x, \phi)$ with respect to $\phi$, T is the transposition operator, and · stands for matrix dot product.

From Eq. (4) and Eq. (2), each element in $\nabla_{\phi} f(\hat{x})$ can be written as:

$$\frac{\partial f_A(x, \phi)}{\partial \phi_k^Z} = \sum_{n=1}^{N} \left( \frac{\partial f_A(x, \phi)}{\partial \hat{x}^R[n]} \frac{\partial \hat{x}^R[n]}{\partial \phi_k^Z} + \frac{\partial f_A(x, \phi)}{\partial \hat{x}^I[n]} \frac{\partial \hat{x}^I[n]}{\partial \phi_k^Z} \right) \quad (5)$$

where k=0, 1, . . . , M−1, N is the length of the input sequence and Z∈{R,I}.

By using Eq. (2), $$\frac{\partial \hat{x}^R[n]}{\partial \phi_k^Z}$$

and $$\frac{\partial \hat{x}^I[n]}{\partial \phi_k^Z}$$

in Eq. (5) are computed as follows:

$$\frac{\partial \hat{x}^R[n]}{\partial \phi_k^R} = \frac{\partial \hat{x}^I[n]}{\partial \phi_k^I} = x^R[M - 1 + n - k] \quad (6)$$

$$\frac{\partial \hat{x}^I[n]}{\partial \phi_k^R} = -\frac{\partial \hat{x}^R[n]}{\partial \phi_k^I} = x^I[M - 1 + n - k] \quad (7)$$

The above analysis shows that the relationship between the waveform modification and classification processes can be described by a set of gradients. Moreover, they can be used to devise effective optimization algorithms that solve Problem (RWOP).

Described below is an algorithm to solve Problem (RWOP) and compute the optimal FIR filter parameters ϕ by using the Nonlinear Conjugate Gradient (NCG) method and the gradients computed in Eq. (6) and Eq. (7). While our simulation results have shown that NCG is more accurate than other gradient-based optimization algorithms (e.g., gradient descent algorithms), example embodiments such as the system 600 are independent of the actual algorithm used to compute ϕ, and other approaches can be used to solve Problem (RWOP).

Filter taps computation through NCG: As shown in FIG. 6, the system 600 iteratively adapts to channel fluctuations by periodically updating the filter taps associated to any given target device A. For the sake of generality, we refer to this periodic update as an optimization epoch, and a new epoch is started as soon as one or more triggering events are detected by the system 600. Triggering events can be either cyclic, e.g., timer timeout, or occasional, e.g., the accuracy for a target device falls below a minimum desired threshold.

For each epoch i, let t=1, 2, . . . , and T denote the iteration counter of the optimization algorithm. At each iteration t of the algorithm:

$$\phi^{(t)} = \phi^{(t-1)} + \alpha^{(t)} p^{(t)} \quad (8)$$

In Eq. (8), $p^{(t)}$ and $\alpha^{(t)}$ represent the search direction and update step of the algorithm, respectively. Thus, $p^{(t)}$ gives us information on the direction to be explored, while $\alpha^{(t)}$ indicates how large the exploration step taken in that direction should be. More in detail, the two terms are computed as follows:

$$p^{(t)} = \sum_{s=1}^{S} (\nabla_{\phi} f_A(x_s, \phi^{(t-1)})) + \beta^{(t)} p^{(t-1)} \quad (9)$$

$$\alpha^{(t)} = \underset{\alpha}{\text{argmax}} \sum_{s=1}^{S} f_A(x_s, \phi^{(t-1)} + \alpha p^{(t)}) \quad (10)$$

with $$\beta^{(t)} = \frac{\left\| \sum_{s=1}^{S} (\nabla_{\phi} f_A(x_s, \phi^{(t-1)})) \right\|_2^2}{\left\| \sum_{s=1}^{S} (\nabla_{\phi} f_A(x_s, \phi^{(t-2)})) \right\|_2^2} \quad (11)$$

where gradients derive from Eq. (6) and Eq. (7), β1=0 and p(0)=0.

Further:

$$p^{(1)} = \sum_{s=1}^{S} \nabla_{\phi} f(x_s, \phi^{(0)}) \text{ when } t=1$$

Thus, the first iteration of the NCG algorithm corresponds to a classic gradient descent. Also, $\alpha^{(t)}$ in Eq. (10) is computed through line-search algorithms. While both exact and approximated line search algorithms can be considered, there are few aspects that need to be considered when implementing Eq. (10). Indeed, since the function f is highly non-linear and has no closed-form representation, to compute Eq. (10) requires the continuous evaluation of:

$$_{s=1}^{S}f(x_S, \phi^{(t-1)} + \alpha p^{(t)})$$

and its first and second order derivatives. For this reason, in some cases it might be computationally expensive to run exact line search algorithms on $f$, and approximated line search algorithms are to be preferred. For example, to speed-up the computation of $\alpha^{(t)}$, we can consider a secant method approximation where the second derivatives of $f$ are approximated by using the first order derivatives computed in Eq. (6) and Eq. (7).

FIR Compensation

Although the waveform filtering process is beneficial to the classifi-cation process as we can optimally modify the waveform generated by a given target device, it may negatively affect the quality of transmitted data. Indeed, moving I/Q symbols within the complex plane might impact the demodulation and decoding process, thus increasing the BER associated to the received waveform. Further-more, the expression of the BER in Constraint (C1) is non-linear and possesses exact and/or approximated closed-form representations only in a limited number of cases (e.g., fading channels with known distributions and low-order modulations).

In view of the above, the BER constraint in Problem (WOP) presents a challenge because is requires mechanisms that are generic enough to be used with any modulation, coding and channel distributions. To overcome the above issues, we observe that our waveform modification relies on Eq. (1), which represents a discrete convolution between the input sequence x and the filter taps $\phi$. For the sake of illustration, in the following we use the model:

$$z[n] = (h \circledR \hat{x})[n] + w[n] \quad (12)$$

where each received I/Q symbol z[n] is written as the sum of a noise term w[n] (typically Additive white Gaussian noise) and the n-th element of the discrete convolution $h \circledR \hat{x}$ between the channel h and the transmitted filtered sequence $\hat{x}$. From Eq. (1), we also have that $\hat{x} = x \circledR \phi$. Thus, the discrete Fourier transform (DFT) of z and $\hat{x}$ can be written as follows, where capital letters indicate DFTs:

$$Z(f) = H(f)\hat{X}(f) + W(f) \quad (13)$$
$$= H(f)X(f)\Phi(f) + W(f)$$

$$X(f) = \frac{Z(f) - W(f)}{H(f)\Phi(f)} \quad (14)$$

Eq. (14) shows that to reconstruct the original unfiltered I/Q sequence is possible by computing the inverse DFT of each compo-nent of the received signal. Furthermore, FIR compensation implies $BER_A(x, \phi) = BER_A(x)$. Because the optimization variable of Problem (WOP) is $\phi$, Constraint (C1) does not depend on $\phi$ anymore, and thus it can be removed from Problem (WOP). Finally, note that the above FIR compensation method is independent of the underlying modulation and coding scheme. It means, that FIR compensation is a general approach, and it can be successfully used to tackle Constraint (C1).

Despite the above properties, it could be concluded that, in general, it is not possible to compute a perfect estimation of W(f) and H(f). However, modern wireless networks embed estimation mechanisms that are almost always able to compute fairly accurate estimations $\tilde{H}(f)$ and $\tilde{N}(f)$, e.g., through training sequences and pilots, and the effect of the FIR filter can thus be compensated to a significant extent. To validate this conclusion, a number of tests of an example implementation of the system 600 may be run to evaluate the impact of the system's FIR filtering on the packet error rate (PER) and throughput ($\theta$) of a wireless transmission. Results of those tests are described below with reference to FIGS. 8 and 9.

Figure 8:
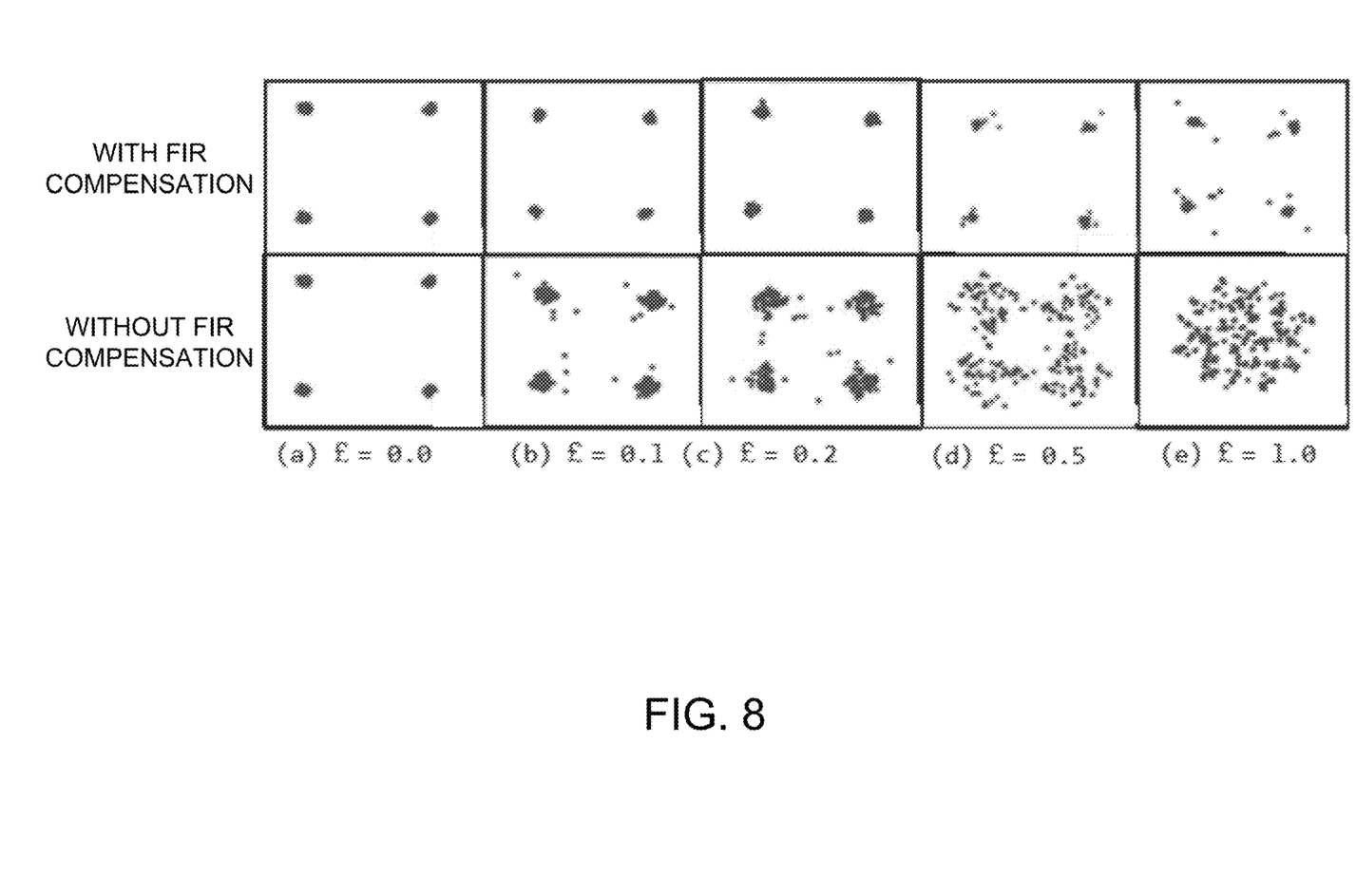
FIG. 8 illustrates received constellations resulting from FIR filtering in one embodiment.

FIG. 8 depicts a series of plots of the received constellations of a QPSK-modulated WiFi transmission where the payload I/Q samples are multiplied in the frequency domain (i.e., FIR filtering) with a random I/Q tap with $I \in [1-\epsilon, 1+\epsilon]$ and $Q \in [0-\epsilon, 0+\epsilon]$) in a test of an example system. The $\epsilon$ parameter represents the relative magnitude of the filter with respect to no filtering, i.e., $\epsilon=0$. The filtering is then compensated at the receiver's side by using Eq. (14). Each column of FIG. 8 represents a different value of $\epsilon$ as indicated by labels (a)-(e). For each value of $\epsilon$, the top plot shows a result with FIR compensation, and the bottom plot shows a result without FIR compensation. Due to the imperfection in channel compensation, some noise may be introduced by the FIR filtering irrespective of compensation. However, these imperfections do not translate in a significant PER increase.

Figure 9:
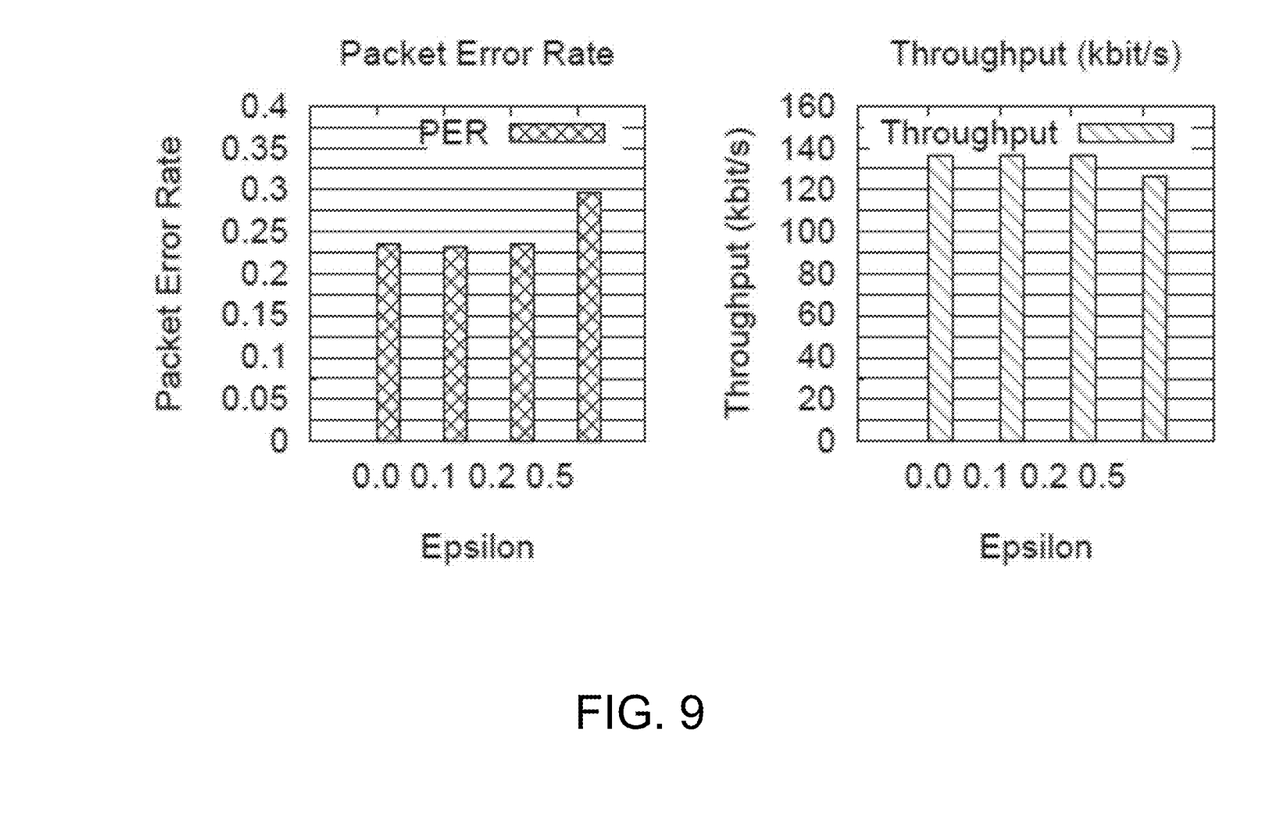
FIG. 9 illustrates charts of packet error rate and throughput resulting from FIR filtering in one embodiment.

FIG. 9 charts the PER and $\theta$ as a function of $\epsilon$ in a test of an example system, which respectively exhibit an increase and decrease of about 6% and 0.5 kbit/s in the worst case of $\epsilon=0.5$. However, in example embodiments, the $\epsilon$ value may be typically below 0.2, meaning a PER increase <1% and a $\theta$ loss <0.2 kbit/s (0.2%).

Example embodiments may include a computer program product, including a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection. The computer program product may be transmitted via a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for routines/programs of example embodiments.

While example embodiments have been particularly shown and described, it will be understood by those skilled in the art that various changes in form and details may be made therein without departing from the scope of the embodiments encompassed by the appended claims.

What is claimed is:

1. A communications system, comprising:
    a transmitter device including:
        a transmitter configured to generate a physical layer signal to be transmitted across a communications channel; and
        a physical signal modifier configured to modify the physical layer signal prior to transmission as a function of a first set of signal modification parameters to produce a modified physical layer signal; and a receiver device including a classifier configured to:
process a received physical layer signal corresponding to the modified physical layer signal received via the communications channel and to output a classification indicator and a score based on characteristics of the received physical layer signal, which includes effects of the communications channel; and
an analyzer configured to analyze the classification indicator and the score to produce a second set of signal modification parameters and to provide the second set of signal modification parameters to the physical signal modifier to produce a subsequent modified physical layer signal to be transmitted across the communications channel.

2. The system of claim 1, wherein the analyzer identifies the transmitter device based on a signature evident in the received physical layer signal, the signature associated with hardware of the transmitter device.

3. The system of claim 2, wherein the physical signal modifier is configured to modify the physical layer signal in a manner emphasizing the signature relative to the signature evident in the physical layer signal.

4. The system of claim 2, wherein the signature is a property of the physical layer signal emergent from one or more imperfections of the hardware of the transmitter device.

5. The system of claim 1, wherein the physical signal modifier is further configured to modify a subsequent physical layer signal based on the second set of signal modification parameters, the physical signal modifier generating a second modified physical layer signal.

6. The system of claim 5, wherein the analyzer is further configured to 1) determine a third set of signal modification parameters based on the classification indicator and score associated with the second modified physical layer signal, and 2) transmit the third set of signal modification parameters to the physical signal modifier.

7. The system of claim 1, further comprising a recovery block configured to transform the received physical layer signal into a data output signal, the recovery block reducing characteristics of the received physical layer signal that correspond to characteristics imposed by the physical signal modifier.

8. The system of claim 7, wherein the recovery block performs the transform via an inverse Fourier transform based on representations of the received physical layer signal and the first set of signal modification parameters.

9. The system of claim 1, wherein the classifier includes a neural network.

10. The system of claim 9, wherein the neural network is a convolutional neural network.

11. The system of claim 9, wherein the score is a vector or matrix of scores that includes gradients generated by the neural network.

12. The system of claim 1, wherein the physical signal modifier is a finite impulse response (FIR) filter.

13. The system of claim 1, wherein the class identifies at least one of the following characteristics of the modified physical layer signal: communications protocol, modulation format, frequency band, communications technology, and encryption scheme.

14. The system of claim 1, wherein the communications channel is a wireless channel.

15. The system of claim 1, wherein the communications channel is one or more of a wired channel, a fiber optic channel, a free space optical channel, and a fluidic channel.

16. The transmitter device of claim 1, wherein the physical signal modifier is a finite impulse response (FIR) filter.

17. The transmitter device of claim 1, wherein the communications channel is a wireless channel.

18. The receiver device of claim 9, wherein the neural network is a convolutional neural network.

19. The receiver device of claim 9, wherein the score is a vector or matrix of scores that includes gradients generated by the neural network.

20. The receiver device of claim 1, wherein the class identifies at least one of the following characteristics of the modified physical layer signal: communications protocol, modulation format, frequency band, communications technology, and encryption scheme.

21. The receiver device of claim 1, wherein the communications channel is a wireless channel.

22. The receiver device of claim 1, wherein the communications channel is one or more of a wired channel, a fiber optic channel, a free space optical channel, and a fluidic channel.

23. A transmitter device, comprising:
a transmitter configured to generate a physical layer signal to be transmitted across a communications channel; and
a physical signal modifier configured to:
modify the physical layer signal prior to transmission as a function of a first set of signal modification parameters to produce a modified physical layer signal,
update the first set of signal modification parameters with a second set of signal modification parameters received from a receiver device following receipt of the modified physical layer signal, and
modify a subsequent physical layer signal prior to transmission as a function of the second set of signal modification parameters to produce a subsequent modified physical layer signal.

24. The transmitter device of claim 23, wherein the physical signal modifier is configured to modify the physical layer signal in a manner emphasizing a signature relative to a signature evident in the physical layer signal, the signature associated with hardware of the transmitter device.

25. The transmitter device of claim 24, wherein the signature is a property of the physical layer signal emergent from one or more imperfections of the hardware of the transmitter device.

26. A receiver device, comprising:
a classifier configured to process a received physical layer signal received via a communications channel and to output a classification indicator and a score based on characteristics of the received physical layer signal, which includes effects of the communications channel; and
an analyzer configured to analyze the classification indicator and the score to produce a set of signal modification parameters and to provide the set of signal modification parameters to a transmitter device to produce a modified physical layer signal to be transmitted across the communications channel.

27. The receiver device of claim 26, wherein the analyzer identifies the transmitter device based on a signature evident in the received physical layer signal, the signature associated with hardware of the transmitter device.

28. The receiver device of claim 27, wherein the set of signal modification parameters indicate modification to the physical layer signal in a manner emphasizing the signature relative to the signature evident in the physical layer signal.

29. The receiver device of claim 27, wherein the signature is a property of the physical layer signal emergent from one or more imperfections of the hardware of the transmitter device.

30. The receiver device of claim 26, further comprising a recovery block configured to transform the received physical layer signal into a data output signal, the recovery block reducing characteristics of the received physical layer signal that correspond to characteristics imposed by a physical signal modifier of the transmitter device.

31. The receiver device of claim 30, wherein the recovery block performs the transform via an inverse Fourier transform based on representations of the received physical layer signal and a previous set of signal modification parameters.

32. The receiver device of claim 26, wherein the classifier includes a neural network.

* * * * *